(12) United States Patent
Gong et al.

(10) Patent No.: US 8,306,055 B2
(45) Date of Patent: Nov. 6, 2012

(54) METHOD AND SYSTEM TO SUPPORT WIRELESS MULTICAST TRANSMISSION

(75) Inventors: Michelle Gong, Sunnyvale, CA (US); Guoqing Li, Portland, OR (US)

(73) Assignee: Intel Corporation, Santa Clara, CA (US)

(*) Notice: Subject to any disclaimer, the term of this patent is extended or adjusted under 35 U.S.C. 154(b) by 384 days.

(21) Appl. No.: 12/647,179

(22) Filed: Dec. 24, 2009

(65) Prior Publication Data

US 2011/0158145 A1 Jun. 30, 2011

(51) Int. Cl.
*H04J 3/22* (2006.01)
*H04J 3/24* (2006.01)

(52) U.S. Cl. ...................................... 370/465

(58) Field of Classification Search ................ None
See application file for complete search history.

(56) References Cited

U.S. PATENT DOCUMENTS

| | | | |
|---|---|---|---|
| 2005/0135416 A1 | 6/2005 | Ketchum et al. | |
| 2006/0184976 A1 | 8/2006 | Lee et al. | |
| 2007/0174478 A1 | 7/2007 | Ryu et al. | |
| 2007/0214279 A1 | 9/2007 | Choi et al. | |
| 2009/0034498 A1* | 2/2009 | Banerjea et al. | 370/338 |
| 2011/0069652 A1* | 3/2011 | Kakani et al. | 370/312 |
| 2011/0143665 A1* | 6/2011 | Cordeiro et al. | 455/41.2 |

OTHER PUBLICATIONS

International Search Report and Written Opinion received for PCT Patent Application No. PCT/US2010/058802, mailed on Sep. 20, 2011.

"WirelessHD Specification Overview," WirelessHD, Aug. 27, 2009, pp. 1-77.
"WiGig White Paper: Defining the Future of Multi-Gigabit Wireless Communications," Wireless Gigabit Alliance, Jul. 2010, pp. 1-5.
Deering, S. "Host Extensions for IP Multicasting," Request for Comments: 1112, Stanford University, Aug. 1989.
Johansson, P., "Protocol Adaptation Layer (PAL) for IEEE 1394 over IEEE 802.15.3 ("wireless 1394")," Congruent Software, Inc., IEEE 802 Tutorial, Portland, OR, Jul. 13, 2004, pp. 1-41.
Wood, S., "WiMedia Open House," WiMedia Alliance, 2008, p. 1-15.
"Wireless Universal Serial Bus Specification," Agere, Hewlett-Packard, Intel, Microsoft, NEC, Philips, Samsung, May 12, 2005, Revision 1.0.
"Wireless Universal Serial Bus Specification: Errata on Revision 1.0 as of Jul. 2005," Agere Systems, Hewlett-Packard, Intel, Microsoft, NEC, Philips, Samsung, Jul. 2005, pp. 1-111.
"Wireless Universal Serial Bus Specification: Errata on Revision 1.0 as of Dec. 2006," Agere, Hewlett-Packard, Intel Microsoft, NEC, Philips, Samsung, Dec. 2006, pp. 1-27.
"Association Models Supplement to the Certified Wireless Universal Serial Bus Specification; Revision 1.0," Agere Systems, Inc., Hewlett-Packard Company, Intel Corporation, Microsoft Corporation, NEC Corporation, Koninklijke Philips Electronics N.V., Samsung Electonics Co., Ltd., Mar. 2, 2006, pp. 1-28.
International Preliminary Report on Patentability for International Application No. PCT/US2010/058802, mailed Jul. 5, 2012; 5 pages.

* cited by examiner

*Primary Examiner* — Xavier Szewai Wong
(74) *Attorney, Agent, or Firm* — Shichrur & Co.

(57) ABSTRACT

A method and system may include a source station to provide wireless multicast transmission to a plurality of destination stations according to a protocol adaptation layer multicast management protocol. The protocol adaptation layer may lie above the MAC layer. The multicast management protocol includes formation, maintenance, and termination procedures. Other embodiments are described and claimed.

17 Claims, 6 Drawing Sheets

METHOD AND SYSTEM TO SUPPORT WIRELESS MULTICAST TRANSMISSION

BACKGROUND

Electronic devices such as computers often transmit signals to receiving stations such as displays or speakers. Such transmission often occurs via wires or cables. Wireless transmission offers freedom from wires and cables. For interoperability among various manufacturers' products, these devices may communicate according to a standard, such as the Wireless Gigabit Alliance (WGA or WiGig) standard as described in one or more upcoming published specifications.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features, and advantages thereof, may best be understood by reference to the following detailed description when read with the accompanied drawings in which:

Figure 1A:
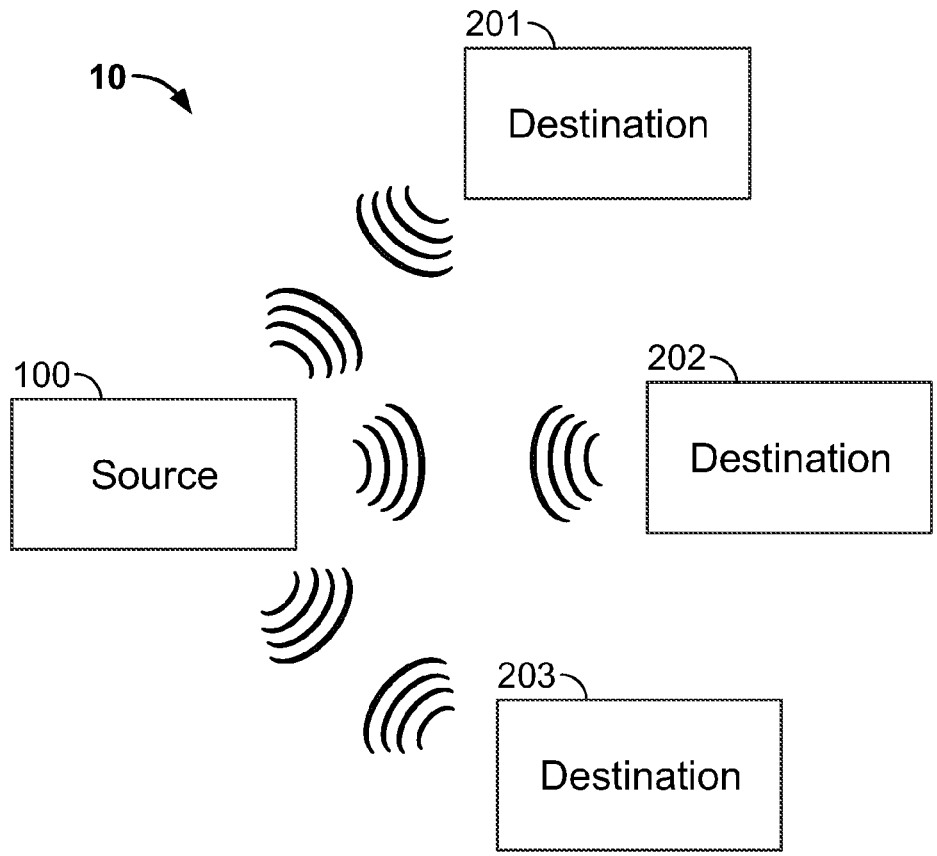
FIG. 1A is a conceptual illustration of a wireless network according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission, or display devices. In addition, the term "plurality" may be used throughout the specification to describe two or more components, devices, elements, parameters, and the like.

Embodiments of the present invention may be used in a variety of applications. Although the present invention is not limited in this respect, the circuits and techniques disclosed herein may be used in many apparatuses such as personal computers (PCs), wireless devices or stations, video or digital game devices or systems, image collection systems, processing systems, visualizing or display systems, digital display systems, communication systems, and the like.

Reference is now made to FIG. 1A, a conceptual illustration of a wireless network 10 operating according to embodiments of the invention. Network 10 may be a wireless network, a wireless local area network (WLAN), or a wireless personal area network (WPAN) that may operate according to Wireless Gigabit Alliance (WGA or WiGig) or other wireless standard. WiGig is designed to operate substantially in the 60 GHz band (or spectrum) and transmit (generally) compressed data from hundreds of megabits per second (Mbps) to several gigabits per second (Gbps). (The 60 GHz band may include transmissions within the range from about 56 GHz to about 66 GHz.) Although the invention is not limited in this respect, network 10 may include a source (or source station) 100 and a plurality of destinations or sinks 201, 202, 203 (or more or fewer stations) that are capable of communicating with each other wirelessly. Source 100 and destinations 201, 202, 203 may be called wireless stations (sometimes abbreviated "STA" in various wireless standards). Examples of source 100 may be a settop box (STB), a laptop or personal computer (PC), a DVD player, a CD player, an MP3 player, a digital video recorder (DVR), a still or video camera, a game console, a cellphone or smartphone, a personal digital assistant (PDA), and other devices. Examples of destinations 201, 202, 203 may be televisions, receivers, displays, monitors, speakers, printers, laptop or personal computers, cellphones or smartphones, personal digital assistants (PDAs), projectors, and other devices. Other network devices may also be included in network 10. FIG. 1A shows source 100 wirelessly transmitting to destinations 201, 202, 203, and such transmission may be data and transmission messages, as described below. In turn, destinations 201, 202, 203 may wirelessly transmit messages back to source 100 (although that is not shown graphically in FIG. 1A).

Figure 1B:
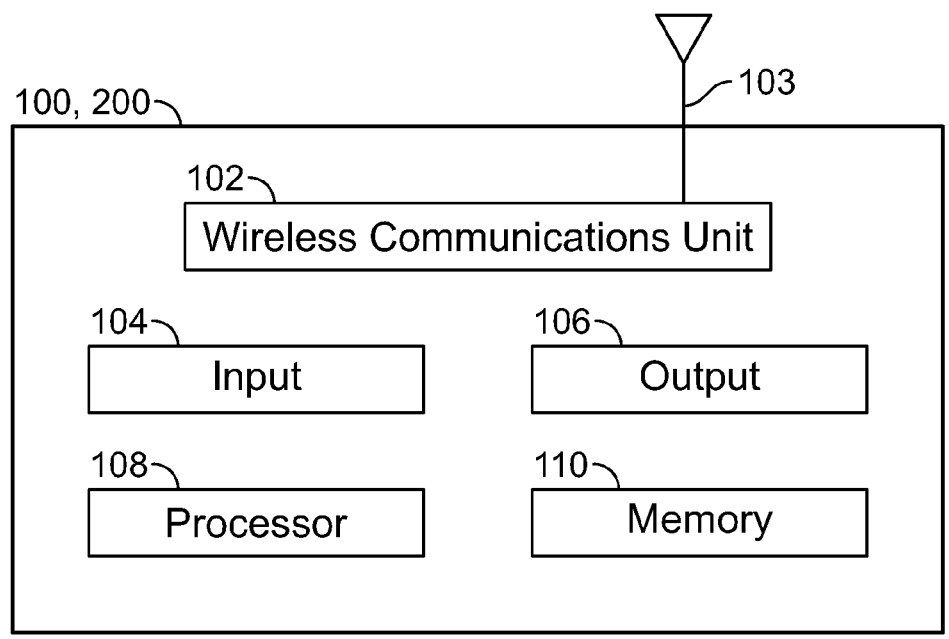
FIG. 1B is a conceptual illustration of a source station or destination station within a wireless network according to embodiments of the invention.

Reference is now made to FIG. 1B, which is a conceptual illustration of a source station 100 or destination station 200 (one or more of destinations 201, 202, 203) within network 10, according to embodiments of the invention. Such station may include wireless communications unit 102 (coupled to antenna 103), input 104, output 106, processor 108, and memory 110. Although source station 100 and destination station 200 are depicted in FIG. 1B, not every source and destination need include all of the above blocks, and within a network the source and destination stations do not have to be identical or even similar. Using such blocks, source 100 and/ or destination 200 may communicate with each other and other wireless devices according to embodiments of the invention, such as by using processor 108 and wireless communications unit 102 (and possibly antenna 103) to transmit and/or receive signals (including data). Input 104 and output 106 may also be used to communicate with other devices. Memory 110 may be a computer or processor readable medium or a computer or processor storage medium, such as, for example, a RAM or RAM, a disk drive, or a USB flash memory.

Figure 2:
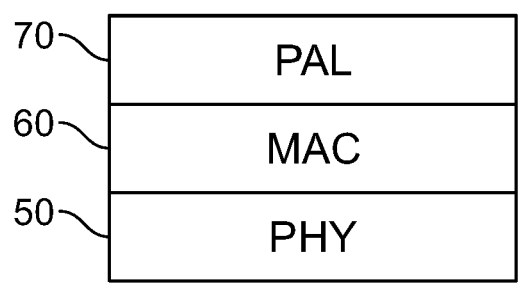
FIG. 2 is a conceptual illustration of a layer management model for a wireless protocol according to embodiments of the invention.

Reference is now made to FIG. 2, a conceptual illustration of a layer management model for a wireless protocol. Various computer network protocols are modeled by layer management models, for example, the OSI (Open System Interconnection) Reference Model (seven-layer model) and the TCP/IP model. The layer management model in FIG. 2 includes PHY (physical) layer 50 and MAC (Media Access Control) layer 60 (sometimes considered a "sublayer") of the OSI model and PAL (protocol adaptation layer) 70, which is used in embodiments of the present invention to interact with MAC layer 60.

In embodiments of the invention, source 100 transmits signals wirelessly to one or more destinations 201, 202, 203 in a multicast (also called "groupcast") format. Multicast transmission may include transmitting the same data stream to multiple destinations. A protocol may manage the formation, maintenance, and termination of the multicast group consisting of the source and destinations. More particularly, such a protocol operates on protocol adaptation layer (PAL) 70, which in some embodiments may be an audio/visual (A/V) PAL. Because of potentially heavy bandwidth requirements, the multicast transmission may have a throughput of hundreds of megabits per second (preferably at least 700 Mbps) or even as much as several gigabits per second (preferably at least 5 Gbps), and may be compressed. Multicast delivery according to embodiments of the invention is designed to account for the lossy nature of wireless communication channels, but because there is no need to build a multicast tree across different routers, it is lightweight in design. Other or different benefits may also be achieved.

Embodiments of the method may be used by, or may be implemented by, for example, source 100 and destinations 201, 202, 203 in network 10, or computing systems and other suitable systems, or by other suitable wireless communication devices, stations, nodes, systems and/or networks. Network 10 may include more than three destinations, but three are shown for simplicity.

Figure 3:
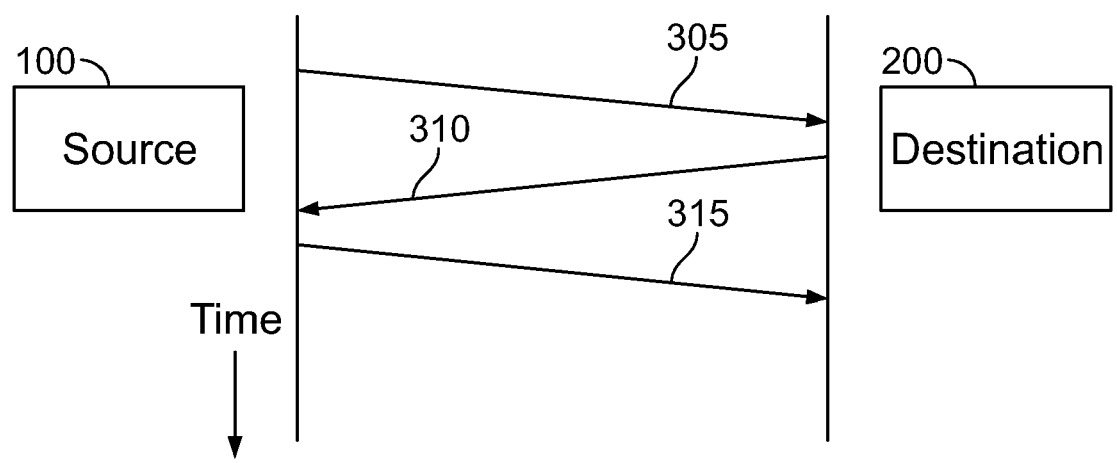
FIG. 3 is a conceptual illustration of a formation or join procedure according to embodiments of the invention.

Reference is now made to FIG. 3, which is a conceptual illustration of a formation or join procedure according to embodiments of the invention. Source 100 is the same as described above; destination 200 represents one or more of destinations 201, 202, 203, understanding that embodiments of the protocol may be used for multicast transmission. At the beginning of the join procedure, source 100, also called a source node or Multicast Group Owner (MGO), may transmit a PAL control message called Multicast Group Join Invite ("Invite message") 305, either in a unicast fashion or in a broadcast fashion. The multicast group may be uniquely identified in the Invite message by a multicast MAC address and a PAL ID. Upon receiving Invite message 305, destination (or destination node) 200 may send a PAL control message called Multicast Group Join Request 310 to source 100, which may reply with a PAL control message called Multicast Group Join Response 315 that indicates whether the join procedure succeeded or not, and, if not, the reasons for failure such as invalid group address or no resource available.

Figure 4:
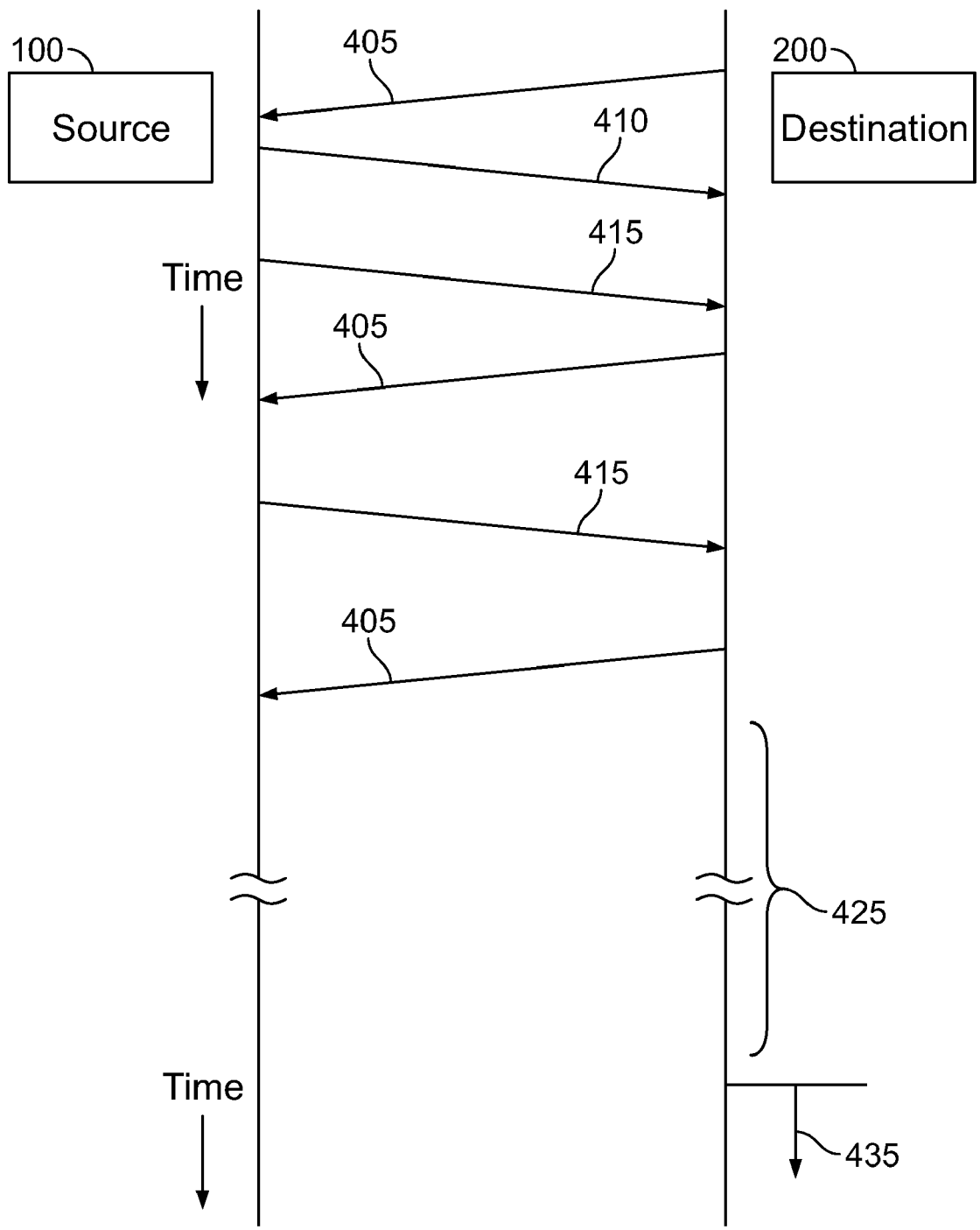
FIG. 4 is a conceptual illustration of a maintenance procedure according to embodiments of the invention.

Reference is now made to FIG. 4, which is a conceptual illustration of a maintenance procedure according to embodiments of the invention. After destination 200 joins a multicast group, it may periodically transmit Multicast Group Confirm Request message 405 to source 100. Source 100 may reply with Multicast Group Confirm Response message 410. Source 100 also periodically may transmit data 415 (or data frames) to destination 200. If data 415 transmitted to the multicast group (i.e., destination 200) is received but Multicast Group Confirm Response message 410 is not received, destination 200 still considers itself to be part of the multicast group. Destination 200 would consider itself not in the multicast group any more 435 if neither Multicast Group Confirm Response message 410 nor data 415 was received from the multicast group owner within a timeout period 425.

Figure 5:
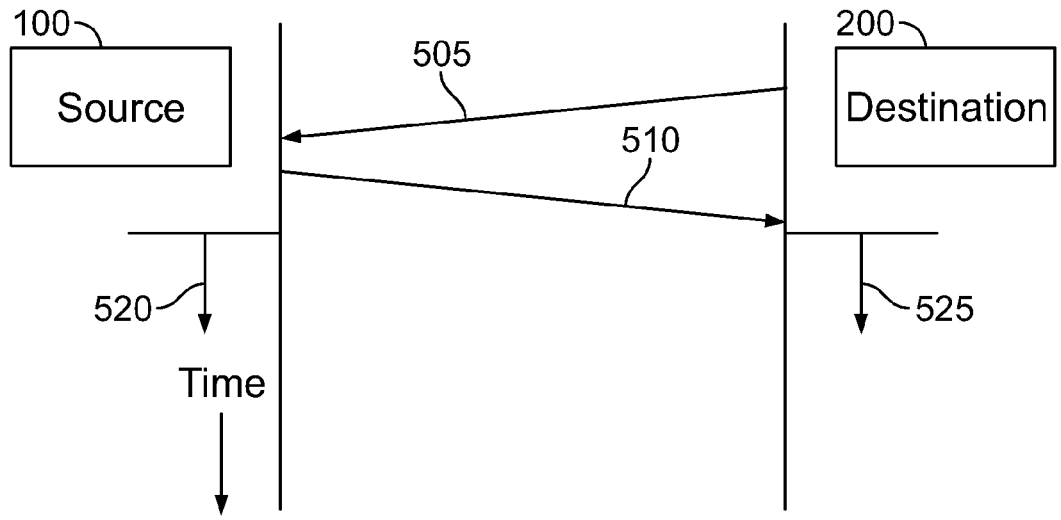
FIG. 5 is a conceptual illustration of a leave procedure according to embodiments of the invention.

Reference is now made to FIG. 5, which is a conceptual illustration of a leave procedure according to embodiments of the invention. During the multicast group leave procedure, destination 200 may transmit a Multicast Group Leave Request message 505 to source 100. Upon receiving Multicast Group Leave Request message 505, source 100 may reply with a Multicast Group Leave Response message 510. Destination 200 stops receiving multicast packets 525 after receiving the Multicast Group Leave Response message 510 or after a timeout period (not shown). Source 100 may consider destination 200 to have left the multicast group 520 after transmitting Multicast Group Leave Response message 510.

Figure 6A:
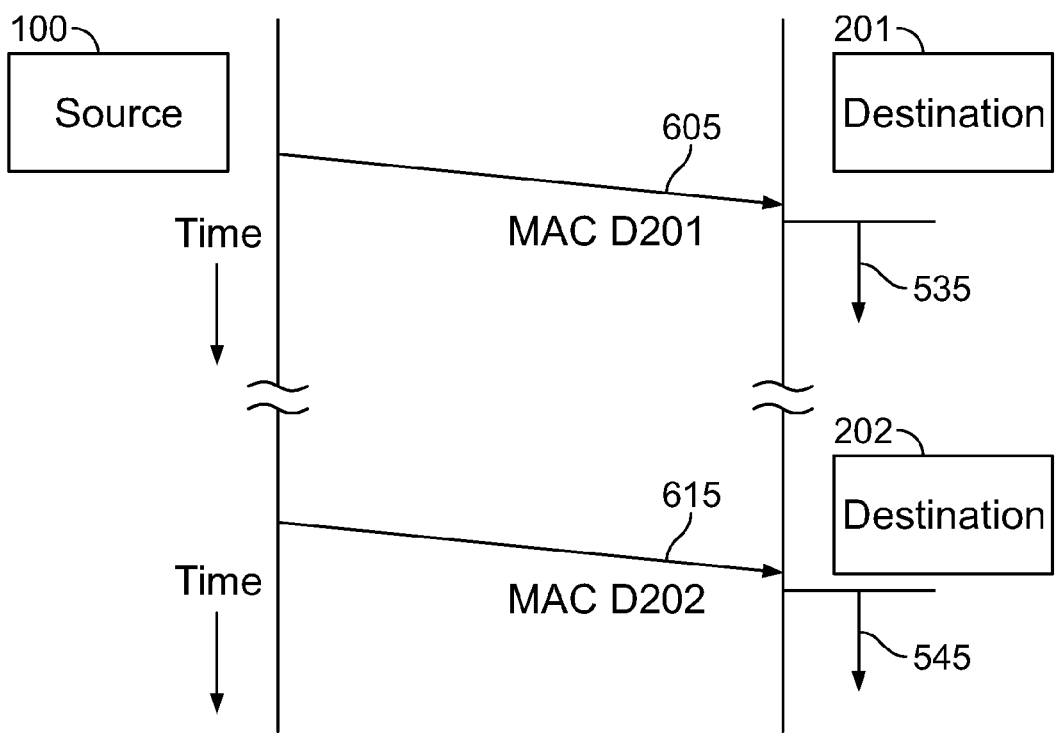
FIGS. 6A-6B are conceptual illustrations of termination procedures according to embodiments of the invention.
Figure 6B:
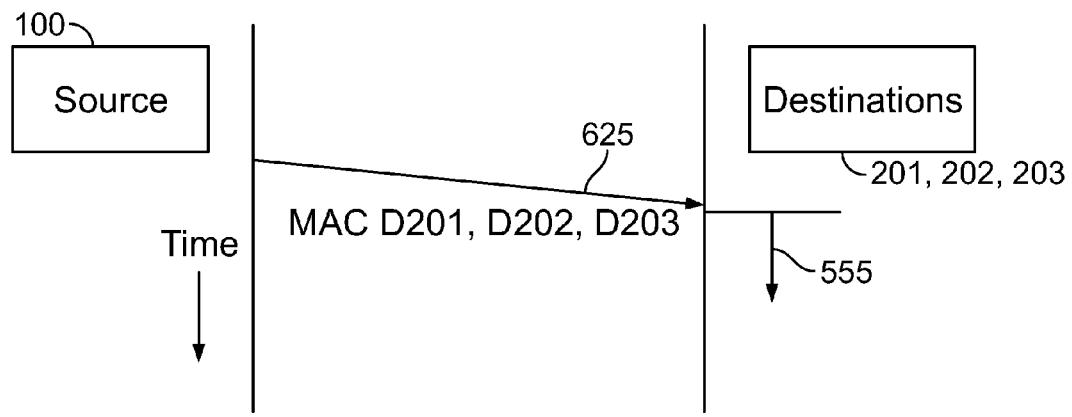

Reference is now made to FIGS. 6A-6B, which are conceptual illustrations of termination procedures according to embodiments of the invention. Source 100 may terminate one or more destinations' memberships (FIG. 6A) or terminate the whole multicast group (FIG. 6B). In FIG. 6A, source 100 may transmit a Multicast Group Termination message 605 that may include the individual MAC address (e.g., D201), and that destination (destination 201) is terminated. Destination 201 then considers itself terminated 535. FIG. 6A also shows that source 100 may terminate destination 202 by transmitting a Multicast Group Termination message 615 that may include the individual MAC address (e.g., D202). Destination 202 then considers itself terminated 545. In FIG. 6B, source 100 may transmit a Multicast Group Termination message 625 that may include the multicast MAC address (e.g., D201/D202/D203), and those destinations (destinations 201, 202, 203) consider themselves terminated 555. The embodiments of FIGS. 6A and 6B can be combined, for example in a five-destination network, by terminating two destinations separately (as in FIG. 6A) and then by terminating the remaining three destinations together (as in FIG. 6B). Moreover, the leave and termination procedures are similar to each other but are initiated by different stations.

Figure 7:
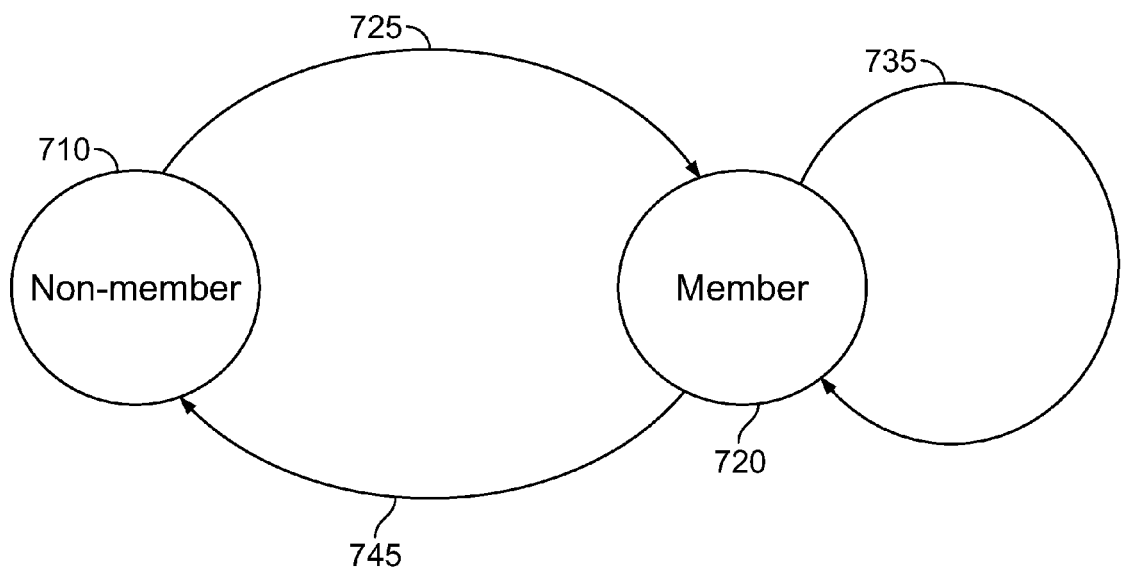
FIG. 7 is a conceptual state diagram of the protocol procedures according to embodiments of the invention.

Reference is now made to FIG. 7, which is a conceptual state diagram of the protocol procedures according to embodiments of the invention. Destination 200, a non-member 710 initially, executes join procedure 725 and is successful, becoming member 720. In order to remain a member 720, destination 200 may receive data or receive a Multicast Group Confirm Response message 735 within a timeout period. Otherwise, destination 200 can leave the group 745 or be terminated 745 or not receive data 745 or a Multicast Group Confirm Response message 745 within a timeout period.

Figure 8:
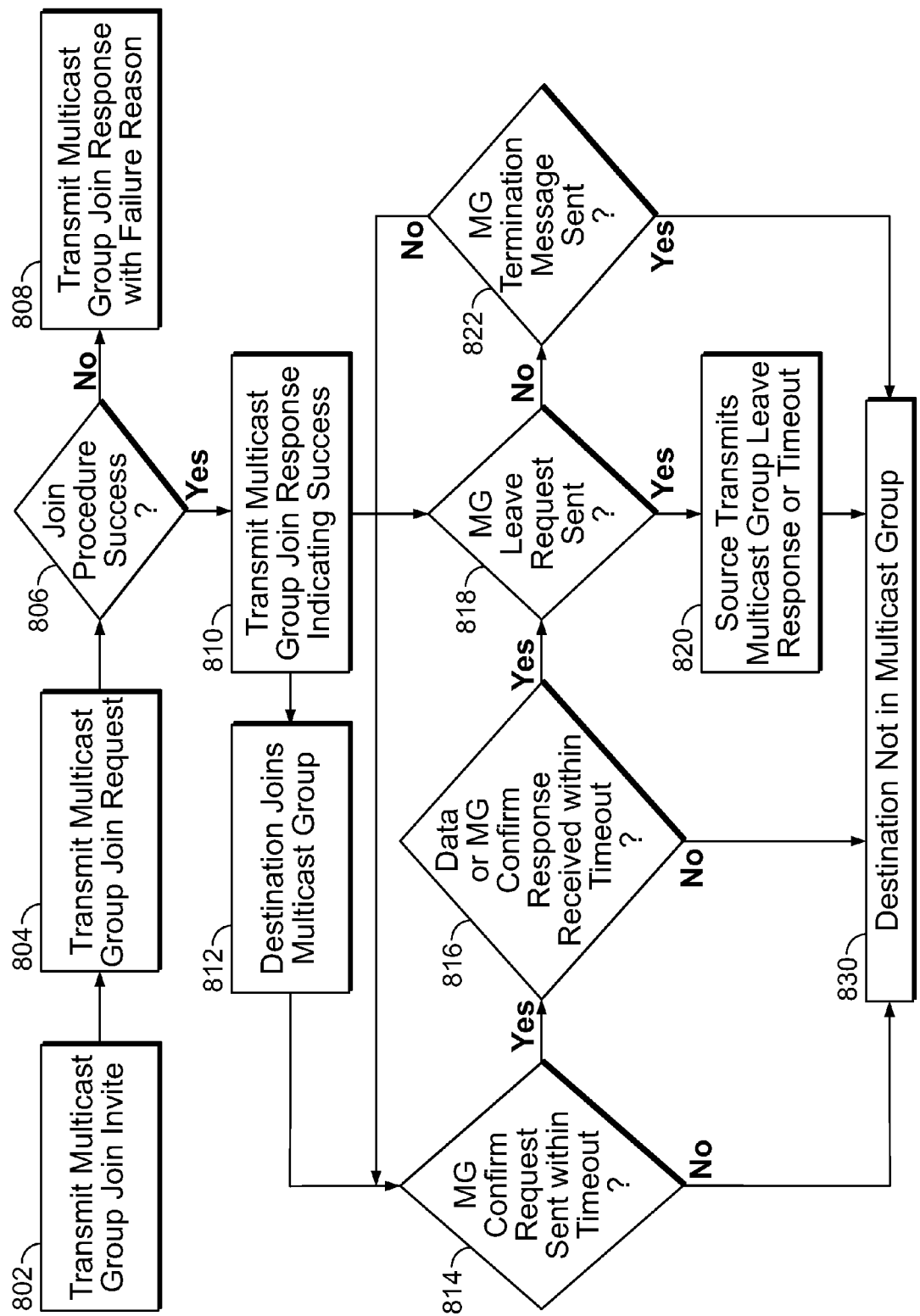
FIG. 8 is a flowchart illustrating such protocol procedures according to embodiments of the invention.

Reference is now made to FIG. 8, which is a flowchart illustrating the protocol procedures according to embodiments of the invention. Embodiments of the method may be used by, or may be implemented by, for example, a computing system 100 or other suitable system. In operation 802, source 100 may transmit Multicast Group Join Invite message 305, and in operation 804, destination 200 may transmit Multicast Group Join Request message 310. Operation 806 asks whether the join procedure succeeded. If not, in operation 808, source 100 may transmit Multicast Group Join Response 315 that indicates the reason for failure. If the join procedure succeeds, operation 810 may transmit Multicast Group Join Response 315 that indicates success, and in operation 812, destination 200 may become a member of the multicast group.

In order to remain a member of the multicast group, in operation 814, source 100 may determine whether destination 200 transmits Multicast Group Confirm Request message 405 within a certain timeout period. If not, in operation 830, destination 200 would no longer belong to the multicast group. If destination 200 transmits Multicast Group Confirm Request message 405 within a certain timeout period, in operation 816, destination 200 may determine whether it receives Multicast Group Confirm Response message 410 or data 415 within a timeout period. If not, in operation 830, destination 200 would no longer belong to the multicast group. If destination 200 receives Multicast Group Confirm Response message 410 or data 415 within a timeout period, in operation 818, source 100 may determine whether destination 200 transmits a Multicast Group Leave Request message 505. If so, in operation 820 source 100 may reply with a Multicast Group Leave Response message 510 and in operation 830, destination 200 would no longer belong to the multicast group. If destination 200 does not transmit a Multicast Group Leave Request message 505, in operation 822, destination 200 may determine whether source 100 transmits a Multicast Group Termination message 605, 615 with the destination's individual MAC address or a Multicast Group Termination message 625 with the multicast MAC address. If so, in operation 830, destination 200 would no longer belong to the multicast group. If not, destination 200 would remain in the multicast group and the loop would return to operation 814. Although the decisions in decision blocks 806, 814, 816, 818, and 822 are described as being performed by either source 100 or destination 200, the decision may be made by the other station or made jointly, depending on the context of the decision, which station is transmitting and which is receiving, and the responsive requirements of the messages exchanged (e.g., some messages expect responses, while others, such as Multicast Group Termination message 605, 615 do not). Besides the flowchart included in FIG. 8, other operations or series of operations may be used. Moreover, the actual order of the operations may not be critical.

Returning to FIG. 1B, in accordance with embodiments of the invention, processor 108 and wireless communications unit 102 (and possibly antenna 103) within source 100 and/or destination 200 may transmit and receive wireless multicast signals according to a protocol adaptation layer multicast management protocol. The protocol adaptation layer may be an audio/visual protocol adaptation layer that lies above the MAC layer. The multicast management protocol may include formation, maintenance, and termination procedures. When acting as a source station, processor 108 may cause wireless communications unit 102 to transmit data and various multicast group messages, such as inviting destination 200 to join a multicast group, signaling success when the join procedure succeeds, confirming group membership during maintenance, confirming a destination station leaving the group, or terminating group membership. When acting as a destination station, processor 108 may cause wireless communications unit 102 to transmit various messages, such as responding to an invitation to join a multicast group, confirming group membership during maintenance, and requesting to leave the group. In both types of stations, processor 108 may process messages and/or data received via wireless communications unit 102, and may interface with memory 110, input 104, and output 106.

Embodiments of the invention may include an article such as a computer or processor readable medium, or a computer or processor storage medium, such as, for example, a memory, a disk drive, or a USB flash memory encoding, including, or storing instructions that, when executed by a processor or controller, carry out methods disclosed herein. Such embodiments may also be delivered and/or transferred to a computer via a network such as the Internet.

While the invention has been described with respect to a limited number of embodiments, it will be appreciated that many variations, modifications, and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
transmitting and receiving wireless multicast signals according to a protocol adaptation layer (PAL) multicast management protocol, the PAL lies above a Media Access Control (MAC) layer, the PAL multicast management protocol includes formation, maintenance and termination procedures, the formation procedure including:
transmitting a PAL control invitation message;
receiving, in response to the PAL control invitation message, a PAL control join request message; and
transmitting, in response to the PAL control join request message, a PAL control join response message, which indicates whether or not the formation procedure is successful.

2. The method of claim 1, wherein said protocol adaptation layer is an audio/visual protocol adaptation layer.

3. The method of claim 1, wherein said maintenance procedure includes transmitting a PAL confirmation message.

4. The method of claim 1, wherein said termination procedure includes transmitting a PAL termination message.

5. The method of claim 1, wherein said transmission occurs substantially in the 60 GHz spectrum.

6. The method of claim 1, having a throughput of at least 700 Mbps.

7. The method of claim 6, having a throughput of at least approximately 5Gbps.

8. A system comprising a source station to provide wireless multicast transmissions according to a protocol adaptation layer (PAL) multicast management protocol, the PAL lies above a Media Access Control (MAC) layer, the PAL multicast management protocol includes formation, maintenance and termination procedures, the formation procedure including:
transmitting a PAL control invitation message;
receiving, in response to the PAL control invitation message, a PAL control join request message; and
transmitting, in response to the PAL control join request message, a PAL control join response message, which indicates whether or not the formation procedure is successful.

9. The system of claim 8, further comprising a plurality of destination stations to receive wireless transmissions from the source station.

10. The system of claim 8, wherein said protocol adaptation layer is an audio/visual protocol adaptation layer.

11. The system of claim 8, wherein said maintenance procedure includes transmitting a PAL confirmation message.

12. The system of claim 8, wherein said termination procedure includes transmitting a PAL termination message.

13. The system of claim 8, wherein said transmission occurs substantially in the 60 GHz spectrum.

14. The system of claim 8, having a throughput of at least 700 Mbps.

15. The system of claim 14, having a throughput of at least approximately 5 Gbps.

16. An apparatus comprising a processor to provide to a plurality of destination stations wireless multicast transmission according to a protocol adaptation layer (PAL) multicast management protocol, the PAL lies above a Media Access Control (MAC) layer, the PAL multicast management protocol includes formation, maintenance and termination procedures, the formation procedure including:
   transmitting a PAL control invitation message;
   receiving, in response to the PAL control invitation message, a PAL control join request message; and
   transmitting, in response to the PAL control join request message, a PAL control join response message, which indicates whether or not the formation procedure is successful.

17. The apparatus of claim 16, wherein said wireless multicast transmission occurs substantially in the 60 GHz spectrum.

* * * * *